United States Patent [19]

Franklin et al.

[11] Patent Number: 4,800,542
[45] Date of Patent: Jan. 24, 1989

[54] TILT SENSOR FOR RESOLVING LEFT-RIGHT AMBIGUITY IN UNDERWATER ACOUSTIC DETECTION SYSTEMS

[75] Inventors: J. Barrie Franklin; Garfield W. McMahon, both of Dartmouth, Canada

[73] Assignee: Her Majesty the Queen in right of Canada, as represented by the Minister of National Defence of Her Majesty's Canadian Government, Canada

[21] Appl. No.: 120,126

[22] Filed: Nov. 13, 1987

[30] Foreign Application Priority Data

Dec. 8, 1986 [CA] Canada .................................. 524791

[51] Int. Cl.$^4$ .................... G01V 1/38; G01F 23/26; H04R 1/02
[52] U.S. Cl. .................................. 367/154; 367/181; 367/19; 367/20; 181/112; 181/122; 73/304 C; 73/649; 33/1 PT; 33/366; 340/689
[58] Field of Search .................. 181/122, 112; 367/13, 367/16, 17, 18, 19, 20, 106, 130, 153, 154, 166, 170, 173, 178, 181, 191; 33/1 M, 1 N, 1 HH, 1 PT, 365, 366, 367, 517, 377; 73/708, 724, 304 R, 304 C, 649; 200/235, DIG. 1; 361/284; 340/689

[56] References Cited

U.S. PATENT DOCUMENTS

| 4,078,223 | 3/1978 | Strange | 367/153 |
| 4,574,491 | 3/1986 | Vining | 33/367 X |
| 4,624,140 | 11/1986 | Ekchian et al. | 33/366 X |
| 4,641,434 | 2/1987 | Engler | 33/366 |

FOREIGN PATENT DOCUMENTS 2003362  3/1979  United Kingdom ................ 367/171

*Primary Examiner*—Brian S. Steinberger
*Attorney, Agent, or Firm*—Larson and Taylor

[57] ABSTRACT

A sensor for resolving the left-right ambiguity encountered in horizontal line hydrophone arrays consists of an orthogonal pair of dipole hydrophones, a monopole hydrophone, and a tilt sensor, the tilt sensor connecting the dipole hydrophones so as to provide a single dipole hydrophone which is always oriented horizontally. The tilt sensor consists of two variable capacitors made from hollow cylinders of high permittivity dielectric material, partially filled with a quantity of liquid mercury which forms the variable inner electrodes of the capacitors. The outer electrodes of the capacitors, on the outside of the cylinders, having a sinusoidally-shaped perimeter and being oriented at right angles to each other, are connected to the crossed dipoles in order to provide the required horizontal dipole hydrophone.

10 Claims, 3 Drawing Sheets

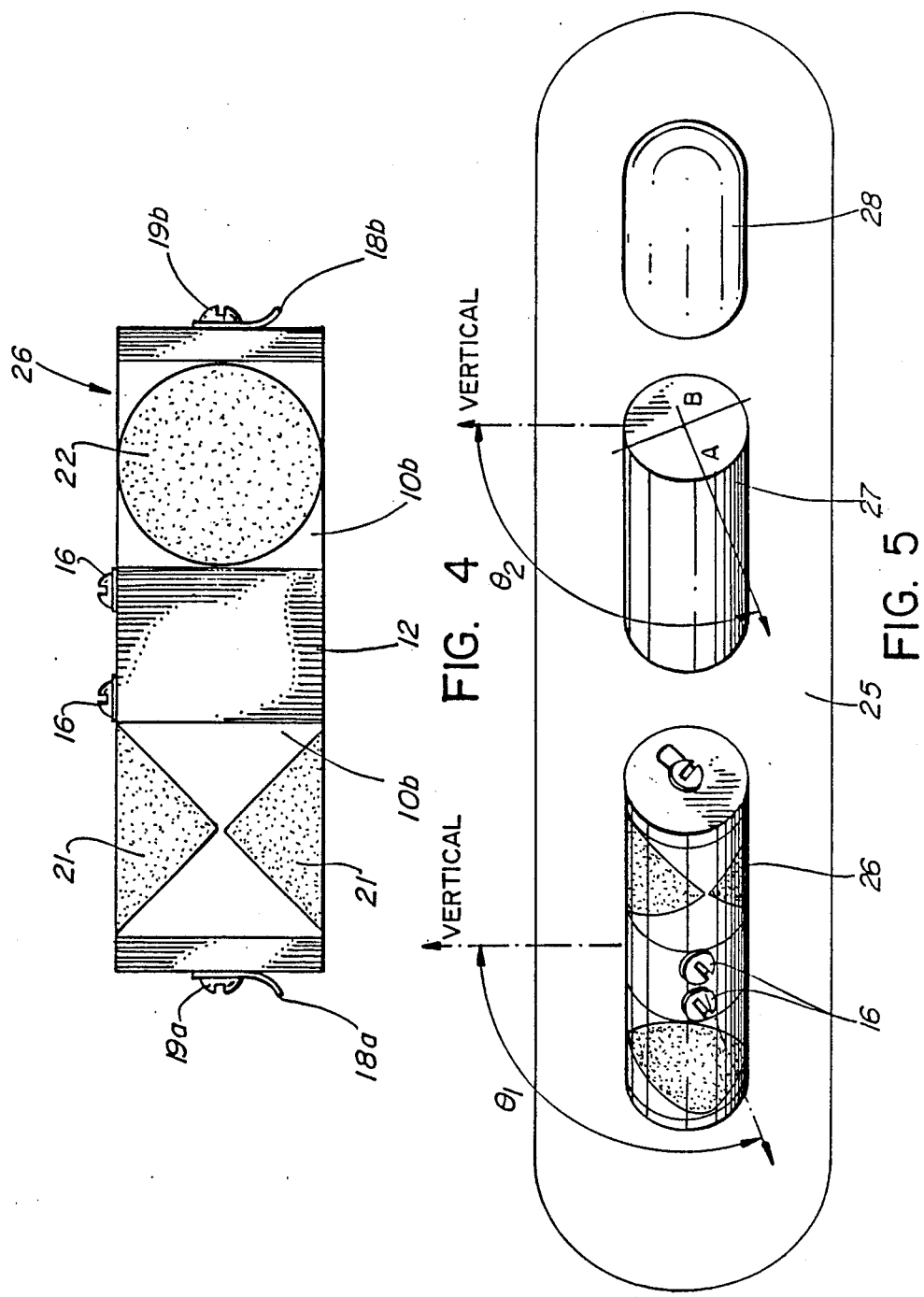

TILT SENSOR FOR RESOLVING LEFT-RIGHT AMBIGUITY IN UNDERWATER ACOUSTIC DETECTION SYSTEMS

FIELD OF THE INVENTION

The present invention relates generally to underwater acoustic detection systems and more particularly to a sensor for resolving the left-right ambiguity in a horizontal line hydrophone array.

BACKGROUND OF THE INVENTION

Horizontal line hydrophone arrays are widely used in underwater seismic exploration and military sonar systems, being towed behind a ship. Usually, they contain many omnidirectional sensors whose signals are processed to form beams that can be electronically steered to any direction. However, because the array is omnidirectional about its axis, there is ambiguity as to whether a received signal is coming from the left-hand or right-hand side of the line. The line array, being towed horizontally, may also be subject to random twists throughout its length, and so the vertical orientation of the individual elements of the array cannot be controlled. This does not matter if the sensors are omnidirectional, and the resulting left-right ambiguity is acceptable; however, for most systems, performance would be much improved by resolving the ambiguity.

This left-right ambiguity has previously been resolved in one of two ways: either by maneuvering the ship so as to take a second reading from a different position, or by installing directional sensors in place of the omnidirectional sensors in the line.

The firsr method is, however, very time consuming and unwieldy. The second requires expensive hardware; because the line hydrophone array is long and flexible, the orientation of individual sensors about the line axis cannot easily be controlled. Each of the individual sensors must comprise an orthogonal pair of dipole hydrophones, for sensing acoustic acceleration, velocity, or pressure gradient; an omnidirectional monopole hydrophone, for sensing pressure; and a tilt sensor, the signals from these being electronically processed to form a single directional element in the line array. If the processing is done in the array, the electronics in the array are complex and expensive. If the processing is done on the ship, four separate signals must be carried by the tow-cable to the ship for each sensor group.

One of the simplest directional hydrophones, used in the above sensors, consists of a dipole hydrophone in combination with a monopole hydrophone. The dipole hydrophone senses a horizontal vector component of th4e acoustic field (velocity, acceleration or pressure gradient), and the monopole hydrophone senses a scalar component (pressure). The two signals are added, with appropriate phase and amplitude adjustment, to form right-facing and left-facing cardioid directivity patterns:

$$P(\theta,\phi) = P[1 + \sin(\theta)\sin(\phi)]$$

$$P(\theta,\phi) = P[1 - \sin(\theta)\sin(\phi)]$$

where $\theta$ is the angle from the vertical, $\phi$ is the azimuth angle, and P is a reference amplitude.

The existence of a suitable crossed dipole sensor is assumed in the following disclosure. Each dipole must have a differential output (as opposed to a single-ended output) and its electrical impedance must be essentially capacitive, but it does not matter which vector component of the sound field is detected, as this merely affects the phase and amplitude adjustment of the signals before they are added together.

SUMMARY OF THE INVENTION

The present invention relates to a sensor, for resolving the left-right ambiguity encountered in horizontal line hydrophone arrays, consisting of an orthogonal pair of dipole hydrophones, a monopole hydrophone, and a tilt sensor, the tilt sensor connecting the dipole hydrophones so as to provide a single dipole hydrophone which is always oriented horizontally. The tilt sensor consists of two variable capacitors made from hollow cylinders of high permittivity dielectric material, partially filled with a quantity of liquid mercury which forms the variable inner electrodes of the capacitors. The outer electrodes of the capacitors, on the outside of the cylinders, having a sinusoidally-shaped perimeter and being oriented at right angles to each other, are connected to the crossed dipoles in order to provide the required horizontal dipole hydrophone. Thus, only two separate signals are carried to the ship by the tow-cable, that of the omnidirectional hydrophone and the now horizontal dipole, and only simple preamplifiers are required in the array itself.

More particularly, the present invention relates to a variable capacitor tilt sensor, comprising: a substantially cylindrical shell having a longitudinally extending wall made of a high permittivity dielectric material and being closed at each end thereof by an end cap made of an insulating material, the enclosed volume formed thereby being partially filled with mercury; the inside surface of the shell defining the enclosed volume being coated by a liquid of relatively high permittivity; first conducting means in contact with the outside surface of the wall of the shell; and second conducting means in contact with the mercury.

The present invention further relates to the above tilt sensor, wherein the shell is divided into a substantially equal first part and a substantiallyequal second part by a transverse section of insulating material extending through the shell, and wherein a first part of the second conducting means is in contact with the mercury in the first part of the shell and a second part of the second conducting means is in contact with the mercury in the second part of the shell. The present invention still further relates to the above tilt sensor, wherein a first part of the first conducting means in contact with the first part of the shell comprises a coating of conductive material having a sinusoidally-shaped perimeter, and wherein a second part of the first conducting means in contact with the second part of the shell comprises a coating of conductive material having a sinusoidally-shaped perimeter and being oriented at right angles to the coating of the first part of the first conducting means.

BRIEF DESCRIPTION OF THE DRAWINGS

A preferred embodiment of the present invention will now be described in conjunction with the attached drawings, in which:

FIG. 4 is a vertical plan view of the tilt sensor of FIG. 1, depicting the configuration of the external electrodes;

FIG. 5 depicts a section of a line array, containing the sensors required for a single directional hydrophone element;

DETAILED DESCRIPTION OF THE PREFERRED EMBODIMENT

Figure 1:
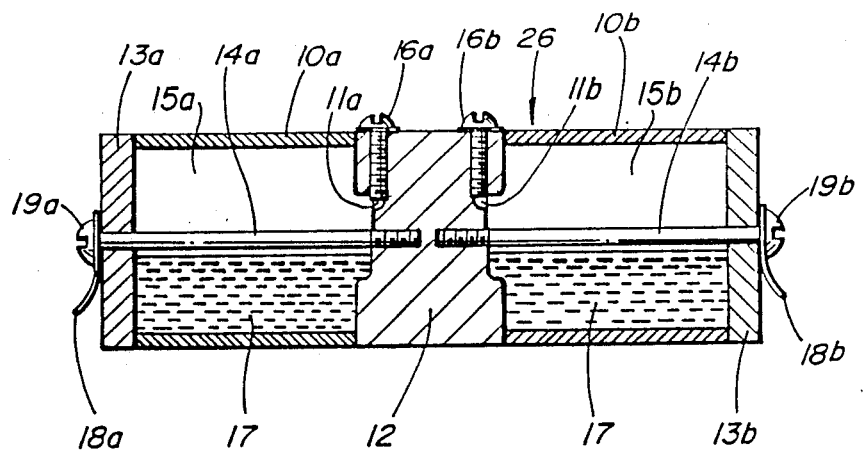
FIG. 1 is a vertical cross-sectional view through the longitudinal axis of the tilt sensor of the present invention.
Figure 2:
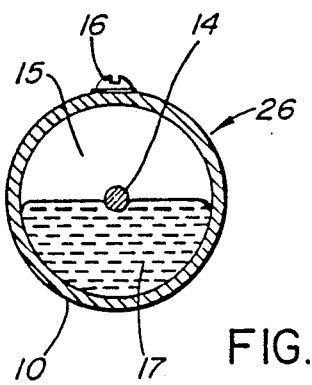
FIG. 2 is a vertical cross-sectional view perpendicular to the longitudinal axis of the tilt sensor of FIG. 1.

Referring to FIGS. 1 and 2, a tilt sensor 26 of the present invention is formed from two cylindrical shell walls 10, also referred to separately as 10a and 10b, made of a high permittivity dielectric material such as lead zirconate-titanate, bonded to a central block 12 made of an insulating material such as phenolite. End caps 13a and 13b, also made of an insulating material such as phenolite, are bonded to the opposite ends of walls 10a and 10b. Metal bolts 14a and 14b pass through the centers of, respectively, end caps 13a and 13b, are sealed thereto, and thread into central block 12. Thus, two isolated and sealed compartments 15, also referred to separately as 15a and 15b, enclosed by central block 12, cylindrical shell walls 10a and 10b, and end caps 13a and 13b, are formed. Two openings 11a and 11b, fitted with, respectively, filler plugs 16, also referred to separately as 16a and 16b, are formed in central block 12, allowing compartments 15 to be partially filled with a quantity of mercury 17 before plugs 16 are inserted. Bolts 14a and 14b must be made from a metal which does not spontaneously alloy with mercury 17, but which makes an adequate electrical contact with mercury 17. Connecting lugs 18a and 18b are placed under bolt heads 19a and 19b, respectively, in order to effect the electrical connections between mercury 17 and the external electrical circuitry.

Figure 3:
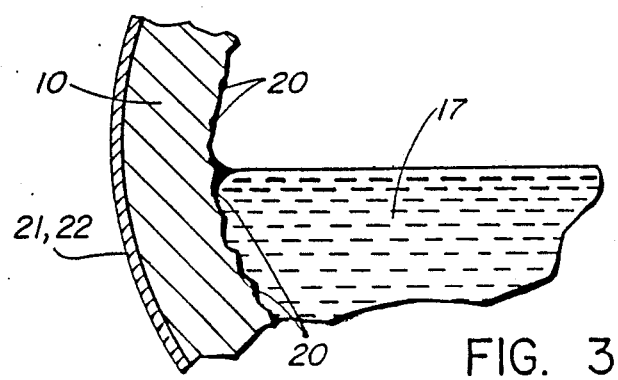
FIG. 3 is an enlarged view of a portion of the tilt sensor of FIG. 2.

Because the inside surfaces of cylindrical shell walls 10a and 10b are not perfectly smooth, mercury 17 cannot make intimate contact with the dielectric material thereof, due to its surface tension. Small inclusions of low permittivity gas between the mercury and the high permittivity dielectric in compartments 15 can further lower the capacitance, by up to 50%. This problem is alleviated by including a small amount of a high permittivity liquid 20 in compartments 15. Liquid 20 coats the inside surface of cylindrical shell walls 10 and couples mercury 17 to shell walls 10 more efficiently. This is illustrated in FIG. 3, which is an enlarged cross-sectional view of tilt sensor 26, at a mercury meniscus thereof, depicting the surface roughness of walls 10 in exaggerated form. Dielectric liquid 20 fills the pockets between mercury 17 and walls 10 which would otherwise be filled with a gas or vacuum. The thin coating afforded by dielectric liquid 20 is provided by running a quantity of liquid 20 into and out of compartments 15 before the same are filled with mercury 17. Suitable dielectric liquid materials include ethanol, ethylene glycol and glycerol, which have relative permittivities of 24.3, 37.7, and 42.5 respectively, compared to 1.0 for air or vacuum and 1600 for lead zirconate-titanate.

Another advantage provided by dielectric liquid 20 is the damping of surface waves in mercury 17. Because mercury has a very low viscosity, surface waves in compartments 15 can reverberate for considerable time, and standing waves cound be set up, leading to excessive noise in the hydrophone. The three liquids indicated above have a wide range of viscosities and are mutually soluble, allowing the appropriate damping to be selected.

FIG. 4 is a vertical plan view of tilt sensor 26 that shows the configuration of the external electrodes 21 and 22 with respect to cylindrical shell walls 10a and 10b. External electrodes 21 and 22 each have a perimeter that is sinusoidally-shaped and are oriented so as to be at a 90° angle to each other about the axis of the cylinder. (The electrode shapes depicted in FIG. 4, while appearing square and circular, are in fact defined by a sinusoidal boundary projected onto the cylindrical surface of shell walls 10). When dielectric cylindrical walls 10 are made of ceramic, the preferred electrode material is a fired-on silver coating of a kind well known in the industry. Taking the local coordinate of tilt $\theta'$ as zero in the direction of filler plugs 16 (see also the discussion below), the desired electrode areas are proportional to $|\sin(\theta')| \times$ area of electrode 21 and $|\cos(\theta')| \times$ area of electrode 22. The actual electrodes 21 and 22 are made slightly smaller than would be indicated by this calculation, to account for fringing of the electric field at the edges of electrodes 21 and 22. Fringing of the electric field at the edges of the internal mercury electrode is approximately compensated for by the mercury meniscus if walls 10 have a thickness of about 1.6 mm.

FIG. 5 shows a section 25 of a horizontal hydrophone array, containing tilt sensor 26, a crossed-dipoles hydrophone 27, and a pressure hydrophone 28. Normally, section 25 would be housed in a fluid-filled, acoustically transparent hose, which would contain tension cables, electrical cables and support structures for the sensors; for simplicity, these are not shown in FIG. 5, being well known to persons skilled in the art. The spacing between the elements of the array is small in comparison to a wavelength of sound, and the spacing between tilt sensor 26 and hydrophone 27 is small enough that their tilt angles may be considered to be equal; i.e., $\theta_1 = \theta_2 = \theta$, where $\theta$ is the random tilt angle of the array section. Crossed-dipoles hydrophone 27 consists of an orthogonal pair of accelerometers, having sensing directions labelled A and B. Tilt sensor 26 and crossed-dipoles hydrophone 27 are mounted in array section 25 so that the sensing direction A is aligned with filler plugs 16; that is, for A, $\theta' = 0°$, and for B, $\theta' = 90°$. The orientation of pressure hydrophone 28 is immaterial, since it is omnidirectional.

Figure 6:
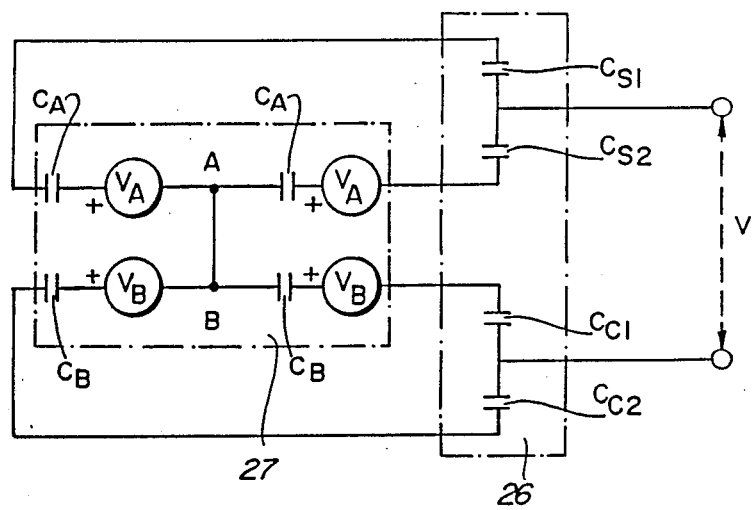
FIG. 6 is an electrical circuit diagram illustrating how the tilt sensor of FIG. 1 and the orthogonal pair of accelerometers are connected.

A horizontal dipole can be obtained from tilt sensor 26 and hydrophone 27 by several methods. A particularly attractive method combines the circuits for tilt sensor 26 and crossed-dipoles hydrophone 27, as shown in FIG. 6. This approach has the considerable advantage of providing a very good approximation to the desired horizontal dipole directivity pattern, using a single channel per station for the directional hydrophone. Other methods which produce a more accurate dipole directivity pattern require more channels per station. Each method is based on the theory presented below.

Figure 7:
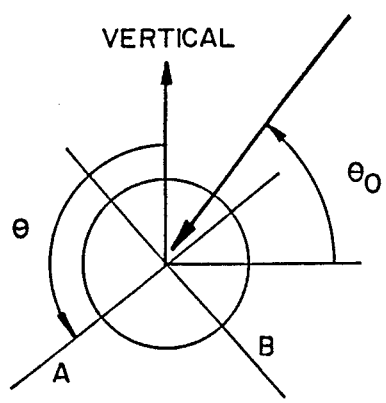
FIG. 7 is a diagram showing the geometric symbols used in the mathematical analysis wherein the directivity pattern is obtained.

Consider a sound wave incident on the accelerometer hydrophone at angle $\theta_o$ with respect to the horizontal, as shown in FIG. 7. Hydrophone 27 and tilt sensor 26 are tilted at an angle $\theta$ with respect to the vertical. The output from dipole channels A and B are given respectively by:

$$V_A = -E \sin(\theta_o - \theta); \quad V_B = E \cos(\theta_o - \theta) \tag{1}$$

where E is the amplitude of the incoming pressure signal. The horizontal dipole channel by the following:

$$V = E \cos \theta_o \tag{2}$$
$$= V_A \sin \theta + V_B \cos \theta$$

The signals $V_A$ and $V_B$ from crossed dipoles sensor 27 and signals from tilt indicator 26, proportional to $\cos \theta$ and $\sin \theta$, can, of course, be transmitted from the towed array to the receiving vessel and combined in accordance with Equation (2). However, the bridge circuit shown in FIG. 6 provides a simple method of combining the signals in the towed array before telemetry to the surface. Because of the shape of electrodes 21 and 22, the capacitances of tilt sensor 26 are given by:

$$C_{S1} = C_S(1 - \sin \theta)/2$$

$$C_{S2} = C_S(1 + \sin \theta)/2$$

$$C_{C1} = C_S(1 + \cos \theta)/2$$

$$C_{C2} = C_S(1 - \cos \theta)/2$$

where $C_S$ is the capacitance of single electrode segment when fully coupled by the mercury. Note that $C_S$ is independent of tilt angle $\theta$. It can be shown that the charge sensitivity of the composite circuit is given by:

$$KQ = \frac{2\beta C[V_A \sin \theta + V_B \cos \theta + (\beta/2)(V_A \sin^3 \theta + V_B \cos^3 \theta)]}{8 + 10\beta + 3\beta^2 + (\beta^3/4) \sin^2(2\theta)} \tag{3}$$

where $\beta = C_S/C$, $C = C_A = C_B$ is the capacitance of one side of an accelerometer channel. A departure from the desired expression given by Equation (2) is clearly evident in Equation (3). The magnitude of the departure depends on the ratio of the accelerometer capacitance to the tilt sensor capacitance. Typical values for the tilt sensor are $C_A = C_B = 4$ nF and $C_S = 5.4$ nF for a cylinder having a length of 2.5 cm, a diameter of 2.5 cm, and a wall thickness of 0.18 cm. For these parameters, $\beta$ is sufficiently small for the departure from the desired directivity pattern to be negligible.

The foregoing has shown and described a particular embodiment of the invention, and variations thereof will be obvious to one skilled in the art. Accordingly, the embodiment is to be taken as illustrative rather than limitative, and the true scope of the invention is as set out in the appended claims.

The embodiments of the invention in which an exclusive property or privilege is claimed are defined as follows:

1. A variable capacitance tilt sensor comprising:
   a substantially cylindrical shell made of high permittivity dielectric material and closed at both ends by end caps made of electrically insulating material to form an enclosed space, said enclosed space being partially filled with mercury,
   first electrically conducting means comprising an electrode in contact with the outside wall of the shell and in the shape of two sinusoidally-shaped portions,
   and second electrically conducting means which is in electrical contact with the mercury,
   wherein the capacitances of the two electrode portions is represented by the equations:

$$C_{S1} = C_S(1 - \sin \theta)/2$$

$$C_{S2} = C_S(1 = \sin \theta)/2$$

wherein $C_S$ is the capacitance of a single first electrode portion when fully electrically coupled with the mercury and $\theta$ is the tilt angle of the sensor.

2. A tilt sensor according to claim 1, wherein the shell is made of ceramic.

3. A tilt sensor according to claim 1, wherein the inside wall of said shell is coated with a dielectric liquid of high permittivity and controllable viscosity.

4. A tilt sensor according to claim 3, wherein said liquid of high permittivity comprises one of the following: ethanol, ethylene glycol, and glycerol.

5. A tilt sensor according to claim 1, comprising a pair of said substantially cylindrical shells, the two shells sharing a common end cap and extending coaxially on opposite sides therefrom and being electrically insulated from each other, both said shells partially filled with mercury and having said first and second electrically conducting means,
   the sinusoidally-shaped portions of the electrode on the second shell being advanced about the axis of the shell by 90° relative to the sinusoidally-shaped portions of the electrode on the first shell, and wherein the capacitances of the two electrode portions of the second shell are represented by the equations:

$$C_{C1} = C_S(1 + \cos \theta)/2$$

$$C_{C2} = C_S(1 - \cos \theta)/2.$$

6. A tilt sensor according to claim 5, wherein said shells are made of ceramic.

7. A tilt sensor according to claim 5, wherein the inside walls of said shells are coated with a dielectric liquid of high permittivity and controllable viscosity.

8. A tilt sensor according to claim 7, wherein said liquid of high permittivity comprises one of the following: ethanol, ethylene glycol, and glycerol.

9. A resolving sensor for resolving the left-right direction ambiguity in a horizontal line hydrophone array comprising a crossed dipoles hydrophone in combination with a monopole hydrophone and a variable capacitance tilt sensor, wherein resulting signals provide left-facing and right-facing cardioid directive patterns in accordance with the following equations:

$$P(\theta, \phi) = P[1 + \sin(\theta) \sin(\phi)]$$

$$P(\theta, \phi) = P[1 - \sin(\theta) \sin(\phi)],$$

wherein P is a reference amplitude, $\theta$ is the angle from vertical, and $\phi$ is the azimuth angle, and wherein the tilt sensor comprises: a substantially cylindrical shell made of high permittivity dielectric material and closed at both ends by end caps made of electrically insulating material to form an enclosed space being partially filled with mercury, first electrically conducting means comprising an electrode in contact with the outside wall of the shell and in the shape of two sinusoidally-shaped portions, and second electrically conducting means which is in electrical contact with the mercury, wherein the capacitances of the two electrode portions is represented by the equations:

$$C_{S1} = C_S(1 - \sin \theta)/2$$

$$C_{S2} = C_S(1 + \sin \theta)/2$$

wherein $C_S$ is the capacitance of a single first electrode portion when fully electrically coupled with the mercury and $\theta$ is the tilt angle of the sensor.

10. A resolving sensor according to claim 9, wherein said crossed dipoles hydrophone comprises an orthogonal pair of accelerometers.

* * * * *